United States Patent
Wu et al.

(10) Patent No.: US 8,693,414 B2
(45) Date of Patent: Apr. 8, 2014

(54) MULTI-USER TRANSMISSION METHOD, MULTIPLE INPUT MULTIPLE OUTPUT TRANSMISSION SYSTEM USING THE SAME, SCHEDULING METHOD AND ACCESS POINT USING THE SAME FOR SCHEDULING SIMULTANEOUS TRANSMISSION

(75) Inventors: Cheng-Hsuan Wu, Taipei (TW); Yen-Chin Liao, Taipei (TW); Yung-Szu Tu, Taipei County (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 197 days.

(21) Appl. No.: 12/968,291

(22) Filed: Dec. 15, 2010

(65) Prior Publication Data
US 2011/0176627 A1 Jul. 21, 2011

Related U.S. Application Data

(60) Provisional application No. 61/295,179, filed on Jan. 15, 2010.

(51) Int. Cl.
*H04W 4/00* (2009.01)
*H04W 28/04* (2009.01)

(52) U.S. Cl.
CPC .................................. *H04W 28/04* (2013.01)
USPC ............ 370/329; 370/203; 370/338; 375/260

(58) Field of Classification Search
USPC ................. 370/203–210, 328, 329–334, 338, 370/341–347; 375/260–265
See application file for complete search history.

(56) References Cited

U.S. PATENT DOCUMENTS

| | | | |
|---|---|---|---|
| 8,265,128 B2 * | 9/2012 | Yu et al. .................... 375/211 |
| 2007/0171808 A1 * | 7/2007 | Wu et al. ................... 370/208 |
| 2007/0274256 A1 | 11/2007 | Murai et al. |
| 2008/0080465 A1 * | 4/2008 | Pajukoski et al. ........... 370/342 |
| 2011/0149723 A1 * | 6/2011 | Gong et al. ................ 370/216 |
| 2011/0219452 A1 * | 9/2011 | Porter ........................ 726/23 |
| 2012/0082200 A1 * | 4/2012 | Verikoukis et al. .......... 375/227 |

FOREIGN PATENT DOCUMENTS

| | | | |
|---|---|---|---|
| CN | 101083516 A | 12/2007 | |
| WO | WO/2008/053550 | * | 8/2008 |

* cited by examiner

*Primary Examiner* — Kan Yuen
(74) *Attorney, Agent, or Firm* — Winston Hsu; Scott Margo (57) ABSTRACT

The present invention discloses a multi-user (MU) transmission method for a multiple input multiple output (MIMO) transmission system comprising a first station and a plurality of second stations. The MU transmission method includes the step of the first station performing simultaneous transmission to a first group of stations of the plurality of second stations in a first transmission interval.

19 Claims, 7 Drawing Sheets

Station with QoS1:
$[0.28 - 0.05i\ \ -1.21 + 0.2i\ \ 0.16 + 0.97i\ \ 0.48 + 0.13i\ \ -0.45 - 0.38i\ \ -0.71 + 1.16i\ \ -0.13 + 0.58i\ \ -0.75 + 0.16i]_{1 \times 8}$ Station with QoS2:
$[-1.36 + 1.26i\ \ 0.33 + 0.28i\ \ 0.9 + 0.01i\ \ 0.45 - 0.29i\ \ 0.98 - 1.09i\ \ 0.93 + 0.16i\ \ -0.64 - 0.97i\ \ -1.63 - 0.59i]_{1 \times 8}$ Station with QoS3:
$[-0.55 - 0.13i\ \ -0.54 - 0.12i\ \ -0.08 - 0.08i\ \ -0.69 + 0.12i\ \ -0.68 - 0.35i\ \ -1.68 - 0.5i\ \ -0.59 + 0.36i\ \ 0.18 - 0.3i]_{1 \times 8}$ Station with QoS4:
$[-0.25 - 0.27i\ \ -1.47 - 0.37i\ \ -0.1 + 0.04i\ \ 0.99 + 0.89i\ \ 0.46 - 1.78i\ \ -0.27 + 0.41i\ \ -0.47 - 0.71i\ \ 0.18 + 0.67i]_{1 \times 8}$ Station with QoS5:
$[0.26 - 0.16i\ \ -0.41 - 0.2i\ \ 1.09 - 0.52i\ \ 0.1 - 0.05i\ \ -1.32 - 1.02i\ \ -0.32 + 0.43i\ \ -0.46 - 0.94i\ \ 0.07 - 0.47i]_{1 \times 8}$ Station with QoS6:
$[-0.33 + 0.06i\ \ -0.99 + 0.54i\ \ -0.26 + 1.58i\ \ -0.33 + 0.23i\ \ 1.24 + 0.61i\ \ 0.53 + 0.48i\ \ 0.05 + 0.39i\ \ -0.21 + 0.71i]_{1 \times 8}$ Station with QoS7:
$[-0.12 + 0.06i\ \ -0.24 + 1.12i\ \ 0.38 - 0.23i\ \ 0.66 + 0.56i\ \ -0.4 - 0.55i\ \ -1.06 - 0.89i\ \ -0.04 + 0.47i\ \ 0.39 - 0.98i]_{1 \times 8}$ Station with QoS8:
$[-0.05 - 1.86i\ \ -1.71 + 0.02i\ \ -0.49 - 0.62i\ \ -0.98 - 0.19i\ \ 0.23 - 0.23i\ \ 0.42 - 0.82i\ \ 0.1 + 0.41i\ \ -0.07 + 0.17i]_{1 \times 8}$

FIG. 5A $$L = \begin{bmatrix} -2.43+0i & 0+0i & 0+0i & 0+0i & 0+0i & 0+0i & 0+0i & 0+0i \\ 0.13+0.12i & 3.48+0i & 0+0i & 0+0i & 0+0i & 0+0i & 0+0i & 0+0i \\ -0.51-1.26i & -0.53-0.18i & -1.8+0i & 0+0i & 0+0i & 0+0i & 0+0i & 0+0i \\ -1.24-0.78i & 0.65-0.04i & 0.23-0.97i & -2.34+0i & 0+0i & 0+0i & 0+0i & 0+0i \\ -0.56+0.06i & 0.38-0.47i & -0.88-0.41i & -0.66+0.41i & 1.98+0i & 0+0i & 0+0i & 0+0i \\ -1.01+0.46i & 0.17+0.82i & 0.68-0.26i & 0.18-0.67i & -1.65-0.02i & -1.26+0i & 0+0i & 0+0i \\ -0.26-0.44i & -0.11+0.18i & -1.22+0i & -0.23+0.87i & -0.03+0.58i & 0.69+1.38i & -0.82+0i & 0+0i \\ -0-0.11i & -0.97+0.25i & -0.54-0.16i & -0.37-0.65i & -0.52-1.41i & -0.03+0i & -0.34-0.75i & -1.35+0i \end{bmatrix}$$

FIG. 5B $$Q = \begin{bmatrix} -0.11+0.02i & 0.5-0.08i & -0.07-0.4i & -0.2-0.05i & 0.19+0.16i & 0.29-0.47i & 0.05-0.24i & 0.31-0.07i \\ -0.38+0.37i & 0.07+0.06i & 0.25+0.02i & 0.14-0.07i & 0.28-0.32i & 0.24+0.05i & -0.2-0.27i & -0.48-0.18i \\ 0.5+0.08i & 0.09-0.29i & -0.29+0.17i & 0.36+0.1i & 0.32+0.09i & 0.45+0.17i & 0.18-0.07i & -0.11+0.07i \\ 0.16+0.05i & 0.25-0.01i & 0.06+0.36i & -0.22-0.45i & -0.1+0.4i & -0.02-0.18i & 0.02+0.26i & -0.38-0.34i \\ 0.36-0.11i & 0.08-0.3i & 0.39-0.19i & -0.04+0.03i & -0.41-0.09i & -0.03+0.23i & 0.03-0.45i & -0.01-0.37i \\ -0.08-0.31i & 0.3-0.05i & -0.02-0.38i & 0.51-0.14i & -0.01-0.19i & -0.27-0.06i & 0.34+0.27i & -0.28-0.04i \\ -0.17-0.26i & 0.41-0.36i & 0.08+0.14i & -0.11-0.06i & 0.06-0.19i & 0.13+0.39i & -0.43+0.35i & 0.21+0.07i \\ -0.23+0.17i & 0.09-0.3i & 0.33+0.24i & 0.48+0.12i & -0.16+0.44i & -0.16-0.19i & -0.13-0.13i & 0.1+0.28i \end{bmatrix}$$

FIG. 5C

MULTI-USER TRANSMISSION METHOD, MULTIPLE INPUT MULTIPLE OUTPUT TRANSMISSION SYSTEM USING THE SAME, SCHEDULING METHOD AND ACCESS POINT USING THE SAME FOR SCHEDULING SIMULTANEOUS TRANSMISSION

CROSS REFERENCE TO RELATED APPLICATIONS

This application claims the benefit of U.S. Provisional Application No. 61/295,179, filed on Jan. 15, 2010 and entitled "METHOD FOR MIMO TRANSMISSION SYSTEM", the contents of which are incorporated herein by reference.

BACKGROUND OF THE INVENTION

1. Field of the Invention

The present invention relates to a multi-user (MU) transmission method and multiple input multiple output (MIMO) transmission system using the same, and scheduling method and access point (AP) using the same, more particularly, to a MU transmission method and MIMO transmission system using the same, and scheduling method and AP using the same capable of scheduling simultaneous transmission to a plurality of stations.

2. Description of the Prior Art

Wireless local are network (WLAN) is widely used in our daily life to provide access to the internet with mobile devices. To improve the throughput in WLAN, IEEE 802.11n standard adopts a multiple input multiple output (MIMO) system that transmits a plurality of streams with multiple antennas and, at the same time, receives the streams with multiple antennas. However, IEEE 802.11n is still based on a point-to-point transmission scheme. When there are more stations connected to an access point (AP), each station (namely user) has to hold the transmission and wait for an empty time slot, i.e. only one station can link with the AP at one time slot.

Carrier sense multiple access/collision avoidance (CSMA/CA) is one of the most popular media access control protocol in wireless communications. For example, in IEEE 802.11 standard, CSMA/CA is defined to achieve wireless channel access while "request to send" (RTS) and "clear to send" (CTS) are used to avoid the hidden terminal problem, i.e. data collision may be caused by multiple stations transmitting data to the AP at the same time. That is, when the AP intends to transmit data to a station, the AP first sends an RTS to the station. Once receiving the RTS, the station responds to the AP with a CTS. After receiving the CTS, the AP starts transmitting data. During this period, other stations monitoring the CTS or RTS should refrain from sending data. In other words, conventionally, only one station can access the channel in one RTS and CTS interval.

In order to increase data throughput, a multi-user (MU) transmission system with MIMO system is proposed. A MU-MIMO system can transmit data to multiple stations with multiple antennas or single antenna at the same time, such that more stations can be served by the AP at the same time.

However, when two stations simultaneously link with the AP, data transmitted in two channels corresponding to the two stations may be interfered by each other if channel conditions of the two channels are similar, i.e. not orthogonal to each other enough. Therefore, the media access control (MAC) used in a conventional MU-MIMO system is performed on a schedule base. In other words, the AP arranges the schedule (time slots), frequency and antenna to transmit data to different stations, i.e. still only one station can link with the AP at one time slot, and does not use CSMA and RTS/CTS packets. Thus, there is a need for improvement of the prior art.

SUMMARY OF THE INVENTION

It is therefore an objective of the present invention to provide a multi-user (MU) transmission method and multiple input multiple output (MIMO) transmission system using the same, and scheduling method and access point (AP) using the same.

The present invention discloses a multi-user (MU) transmission method for a multiple input multiple output (MIMO) transmission system comprising a first station and a plurality of second stations. The MU transmission method includes the step of the first station performing simultaneous transmission to a first group of stations of the plurality of second stations in a first transmission interval.

The present invention further discloses a scheduling method for a first station to schedule transmissions to a plurality of stations. The scheduling method includes the step of scheduling simultaneous transmission to a first group of stations of the plurality of second stations in a first transmission interval according to channel conditions of a plurality of channels corresponding to the plurality of second stations.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
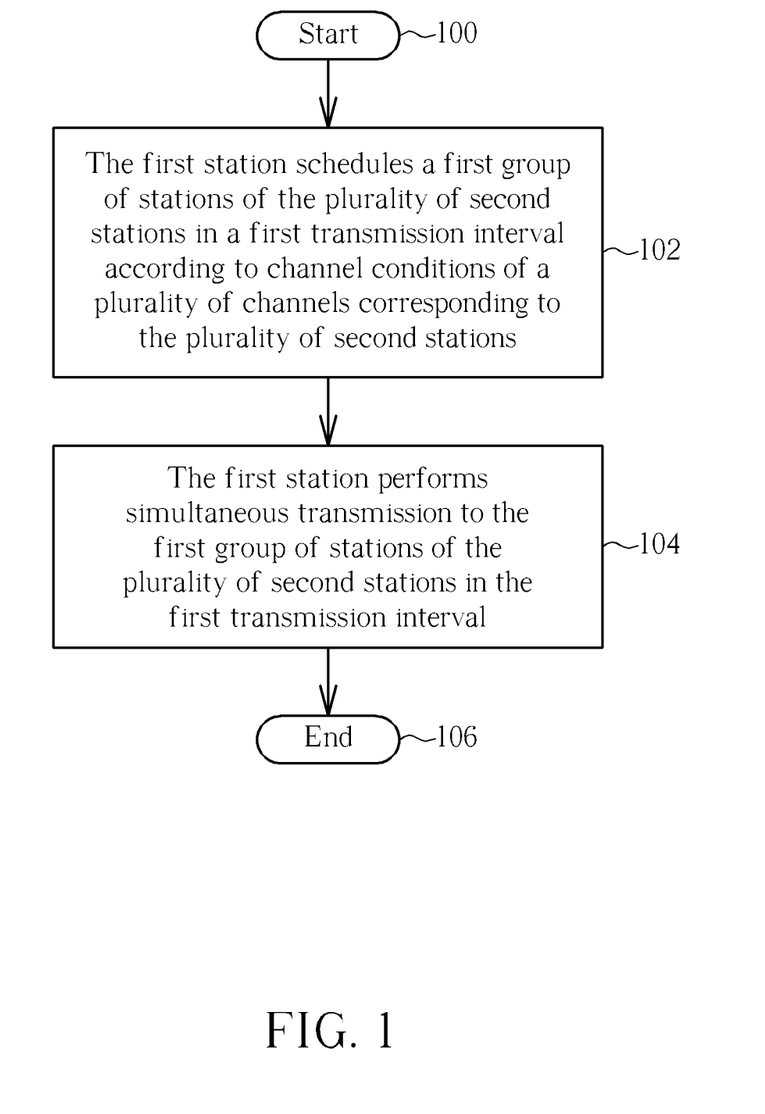
FIG. 1 is a schematic diagram of a multi-user (MU) transmission process for a multiple input multiple output (MIMO) transmission system according to an embodiment of the present invention.

Please refer to FIG. 1, which is a schematic diagram of a multi-user (MU) transmission process 10 for a multiple input multiple output (MIMO) transmission system according to an embodiment of the present invention. The MIMO transmission system includes a first station (can be an access point (AP) or a user) and a plurality of second stations (namely users). The MU transmission process 10 is utilized for the first station to simultaneously transmit to some of the plurality of second stations. The MU transmission process 10 includes the following steps:

Step 100: Start.

Step 102: The first station schedules a first group of stations of the plurality of second stations in a first transmission interval according to channel conditions of a plurality of channels corresponding to the plurality of second stations.

Step 104: The first station performs simultaneous transmission to the first group of stations of the plurality of second stations in the first transmission interval.

Step 106: End.

According to the MU transmission process 10, the first station schedules a first group of stations of the plurality of second stations in a first transmission interval according to channel conditions, e.g. channel state information (CSI), receive beam-forming information, and quality of service (QoS) requirements etc., of a plurality of channels corresponding to the plurality of second stations, wherein channels corresponding to the first group of stations are substantially orthogonal to each other. As a result, the first station can simultaneously transmit data to the first group of stations without interfering since the first group of stations are substantially orthogonal to each other. Noticeably, the first station can be an AP or a user, which means the MU transmission process 10 can utilized for an AP or a station to simultaneously transmit to some of the plurality of second stations.

Take the first station as an AP for example. Please refer to FIG. 2, which is a schematic diagram of a downlink channel access for stations STA1, STA2 according to an embodiment of the present invention. Please note that an amount of stations relates to an amount of the first group of stations of the plurality of second stations described in FIG. 1, and is not limited to 2 of the embodiment and can be any amount. Besides, noticeably, an AP shown in FIG. 2 relates to the first station described in FIG. 1, which illustrates the AP performs scheduling and then simultaneously transmits to some of the second stations. In other embodiments, the first station described in FIG. 1 can be a station as well, which can illustrate the station performs scheduling and then simultaneously transmits to some of the second stations as well, which is not limited to these.

Figure 2:
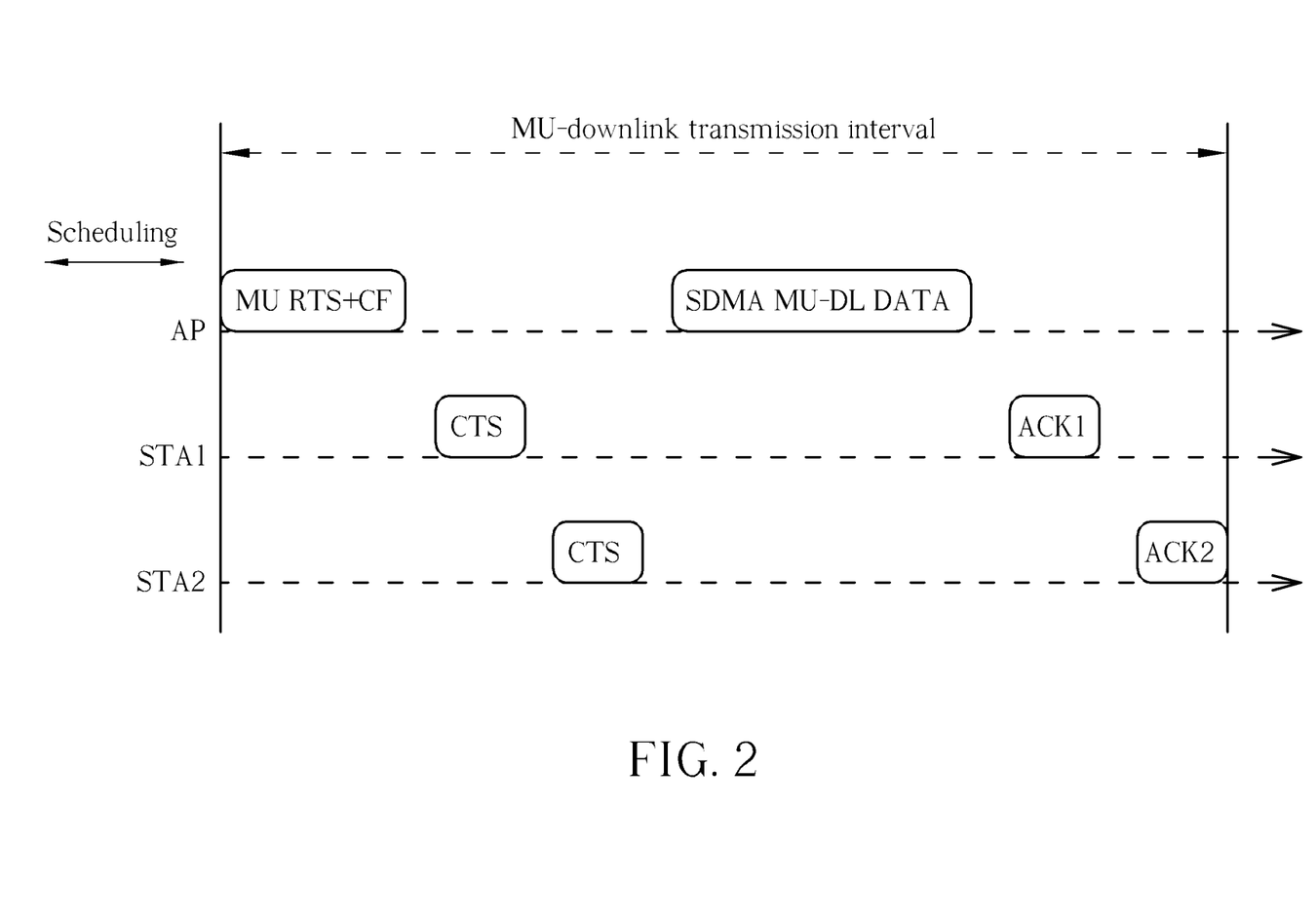
FIG. 2 is a schematic diagram of a downlink channel access for two stations according to an embodiment of the present invention.

In FIG. 2, the AP is assumed to have CSI and receive beam-forming information for all second stations. According to the CSI, the receive beam-forming information and quality of service (QoS) requirements, the AP performs a scheduling process to schedule the stations STA1, STA2 in a MU-downlink transmission interval, i.e. channels corresponding to the stations STA1, STA2 are substantially orthogonal to each other. After the scheduling process is done, the AP transmits a multi-user RTS (MU-RTS) and a control frame (CF) to the stations STA1, STA2, wherein the MU-RTS contains addresses for the stations STA1, STA2 in a scheduling list generated by the scheduling process and the CF indicates respective time slots for each station to respond a CTS, respectively.

After receiving the MU-RTS and the CF from the AP, the stations respond with respective CTSs at the respective time slots indicated by the CF, such that no collision occurs between different stations and thus prevent hidden terminal problem. In other words, the AP transmits the CF to indicate the stations STA1, STA2 to respond the respective CTSs at different time slots as a time division multiplexing (TDM) scheme, e.g. the stations STA2 responds its own CTS after the stations STA1 responds its own CTS.

Noticeably, if any station does not receive the MU-RTS or the AP does not receive any of the CTSs, i.e. at least one CTS corresponding to at least one station is not received by the AP, due to fluctuation of wireless channel or collision of packets, the AP retransmits the MU-RTS and the CF. After a predefined times of retransmission failures, the AP transmits a new MU-RTS and a new CF in a new transmission interval. The new MU-RTS and the new CF can be obtained from another scheduling process performed on all stations except the at least one station with bad channel condition, or can be simply obtained from removing the at least one station from the original the MU-RTS and the CF (MU-RTS+CF).

Then, after receiving all the CTSs, the AP transmits MU-DL data to the stations STA1, STA2 by spatial division multiple access (SDMA), which multiplexes spatial resources such as space, antenna, direction etc., or pre-coding technique. Since the channels corresponding to the stations STA1, STA2 are substantially orthogonal to each other, the AP can transmit the MU-DL data to the stations STA1, STA2 by SDMA or pre-coding technique without interfering. Then, the stations STA1, STA2 respond with acknowledgements (ACKs) at respective time slots indicated by the CF or the MU-DL data frame as a TDM scheme, e.g. the station STA2 responds its own ACK2 after the station STA1 responds its own ACK1. If any station does not decode a corresponding part of the MU-DL data designated to itself correctly, the station does not respond with the ACK, i.e. the AP will not receive the ACK corresponding to the station, and thus the AP retransmits the corresponding part of the MU-DL data in another transmission interval.

On the other hand, if one MU-downlink transmission interval is not enough for the data transmission of all the stations, i.e. channels corresponding to all the stations are substantially orthogonal to each other or data amount for transmission is too much for one transmission interval, more MU-downlink transmission intervals can be defined. In other words, the AP can schedule more than one group in more than one transmission interval according to the channel conditions of the plurality of channels rather than just scheduling the first group in the first transmission interval, wherein channels corresponding to each group of stations in each transmission interval are substantially orthogonal to each other.

Figure 3:
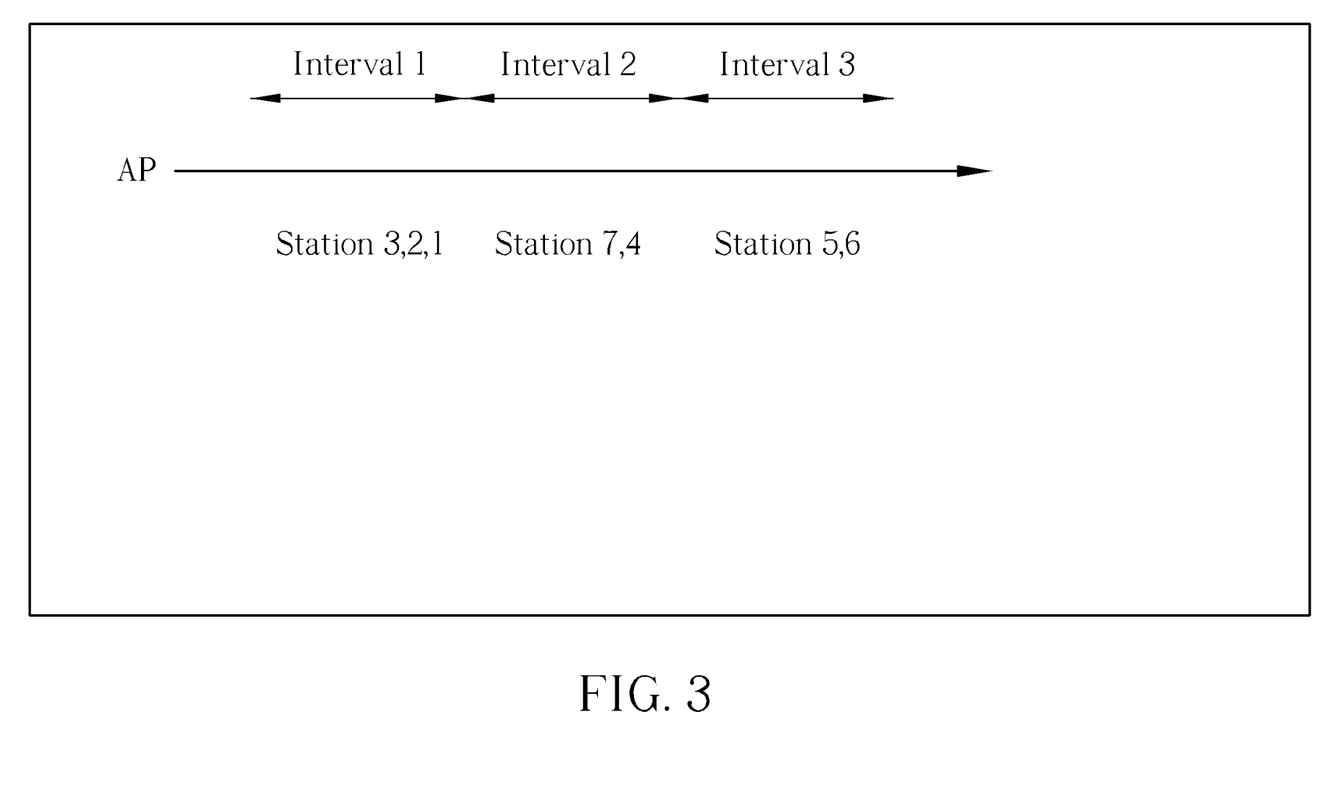
FIG. 3 is a schematic diagram of three MU-downlink transmission intervals 1-3 for eight stations 1-8 according to an embodiment according to the present invention.

For example, please refer to FIG. 3, which is a schematic diagram of three MU-downlink transmission intervals 1-3 for eight stations 1-8 according to an embodiment according to the present invention. As shown in FIG. 3, the MU-downlink interval 1 is for the stations 3, 2, 1, the MU-downlink interval 2 is for the stations 7, 4, and the MU-downlink interval 3 is for the stations 8, 5, 6. The three intervals 1-3 are defined according to the scheduling algorithm using channel conditions such as CSI, receive beam-forming matrix, and QoS requirements, wherein channels corresponding to stations 3, 2 1 in transmission interval 1 are substantially orthogonal to each other, so are channels corresponding to stations 7, 4 in transmission interval 2 and channels corresponding to stations 8, 5, 6 in transmission interval 3.

In detail, in the scheduling process, an orthogonality between two channels can be used to construct an orthogonal set for deciding a group of stations, such that all stations in a same orthogonal set will have orthogonality greater than a predefined threshold, i.e. channels corresponding to all stations in a same group are substantially orthogonal to each other. The orthogonality between two channels can be defined as:

$$\text{orthogonality}(n,m)=\text{amplitude}(L(n,n)/L(n,m)),$$

wherein orthogonality$(n,m)$ denotes an orthogonality between n-th and m-th channels of the plurality of channels, amplitude $(L(n,n)/L(n,m))$ denotes $|L(n,n)/L(n,m)|$, $L(n,m)$ denotes an element of an n-th row and an m-th column in an L matrix, and $m<n$. The L matrix is derived from LQ decomposition of a composite channel matrix of channels corresponding to all the stations.

Figure 4:
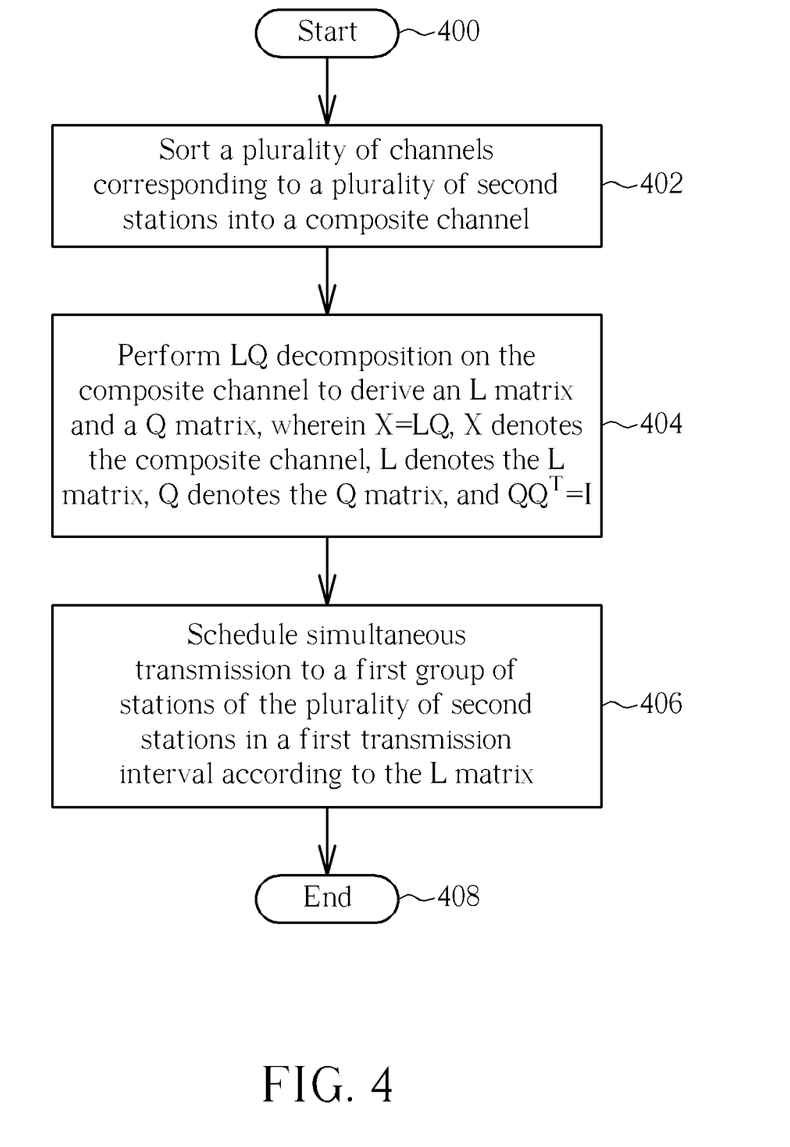
FIG. 4 is a schematic diagram of a scheduling process according to an embodiment of the present invention.

Please refer to FIG. 4, which is a schematic diagram of a scheduling process 40 according to an embodiment of the present invention.

Step 400: Start.

Step 402: Sort a plurality of channels corresponding to a plurality of second stations into a composite channel.

Step 404: Perform LQ decomposition on the composite channel to derive an L matrix and a Q matrix, wherein X=LQ, X denotes the composite channel, L denotes the L matrix, Q denotes the Q matrix, and $QQ^T$=I.

Step 406: Schedule simultaneous transmission to a first group of stations of the plurality of second stations in a first transmission interval according to the L matrix.

Step 408: End.

According to the scheduling process 40, the multi-station (the second stations) channels are sorted into a composite channel according to the QoS requirement of the multi-user. Then, LQ (or QR) decomposition, such as an orthogonalization procedure, is performed on the composite channel matrix, i.e. X=LQ, X denotes the composite channel, L denotes the L matrix, Q denotes the Q matrix, and $QQ^T$=I. The L matrix generated from the LQ decomposition is then used to select the multi-station channels into an orthogonal set, i.e. schedule a first group of stations of the plurality of second stations in a first transmission interval according to the L matrix. As a result, since the AP (i.e. the first station, and can be a station as well) sorts the plurality of second stations according to channel conditions, the AP can schedule simultaneous transmission to channels with better conditions first while the channels are substantially orthogonal to each other.

Specifically, the orthogonalities for each row of L matrix are checked, and if one orthogonality(n,m), where m corresponds to a number of a station that has been determined to be served in this interval (with better channel condition), is less than a predefined threshold, the station corresponding to a row n is not served in this interval. For example, assume an AP use the scheduling process 40 to schedule three stations and two stations have been determined to be served in a certain interval. With the third station joining in, the orthogonalities L(3,3)/L(3,1) and L(3,3)/L(3,2) are compared with the predefined threshold. If all the orthogonalities L(3,3)/L(3,1) and L(3,3)/L(3,2) are greater than the predefined threshold, the third station will be allowed to be served in the same interval with the other two stations. Finally, which stations will be served in a certain interval can be decide.

Noticeably, other than checking a worst case as described above, i.e. all orthogonalities have to be greater than the predefined threshold, the present invention can compare a mean of orthogonalities of each row with the predefined threshold, which is not limited to these.

Figure 5A:
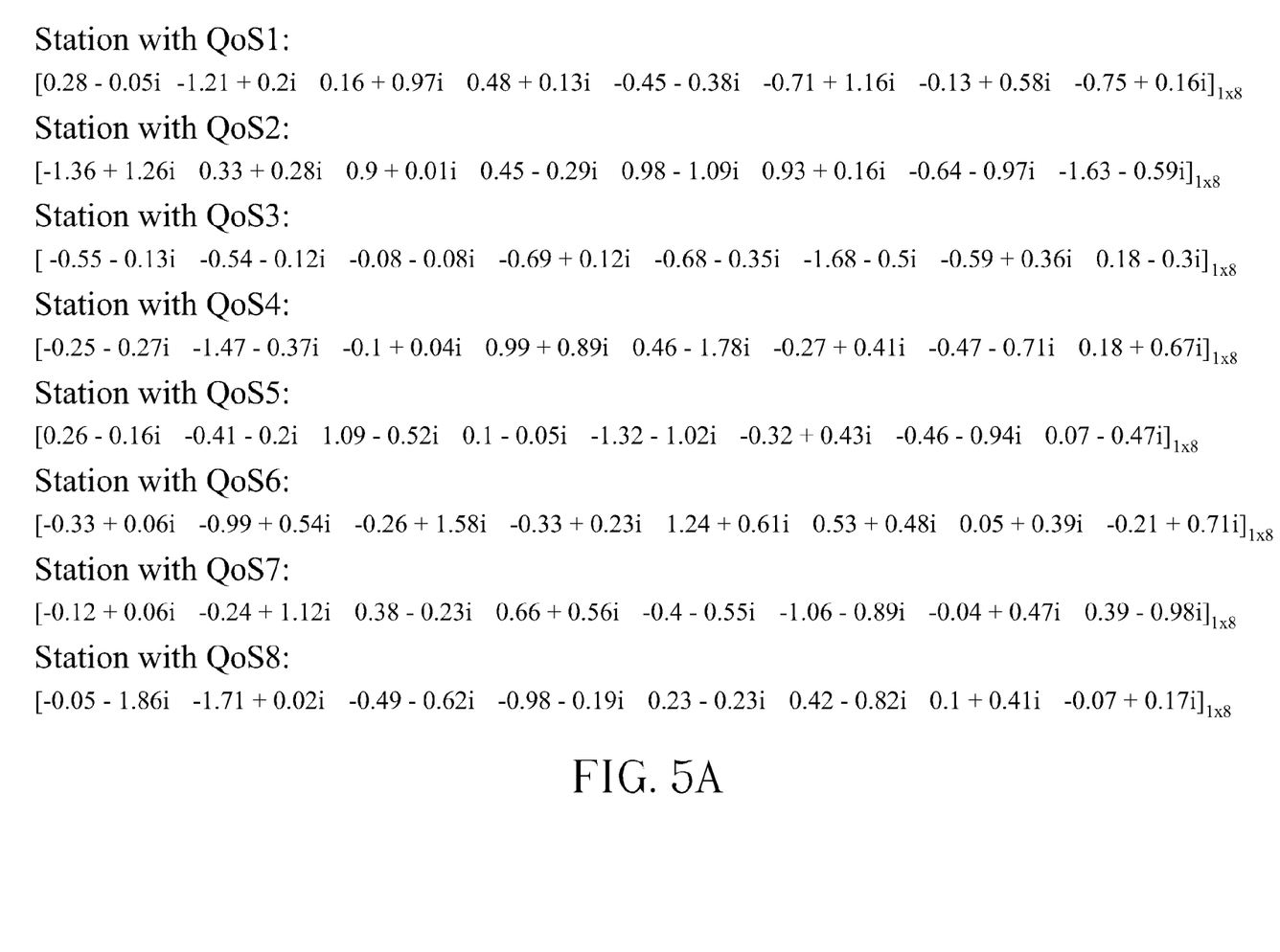
FIG. 5A is a schematic diagram of frequency responses of eight stations sorted according to QoS.
Figure 5B:
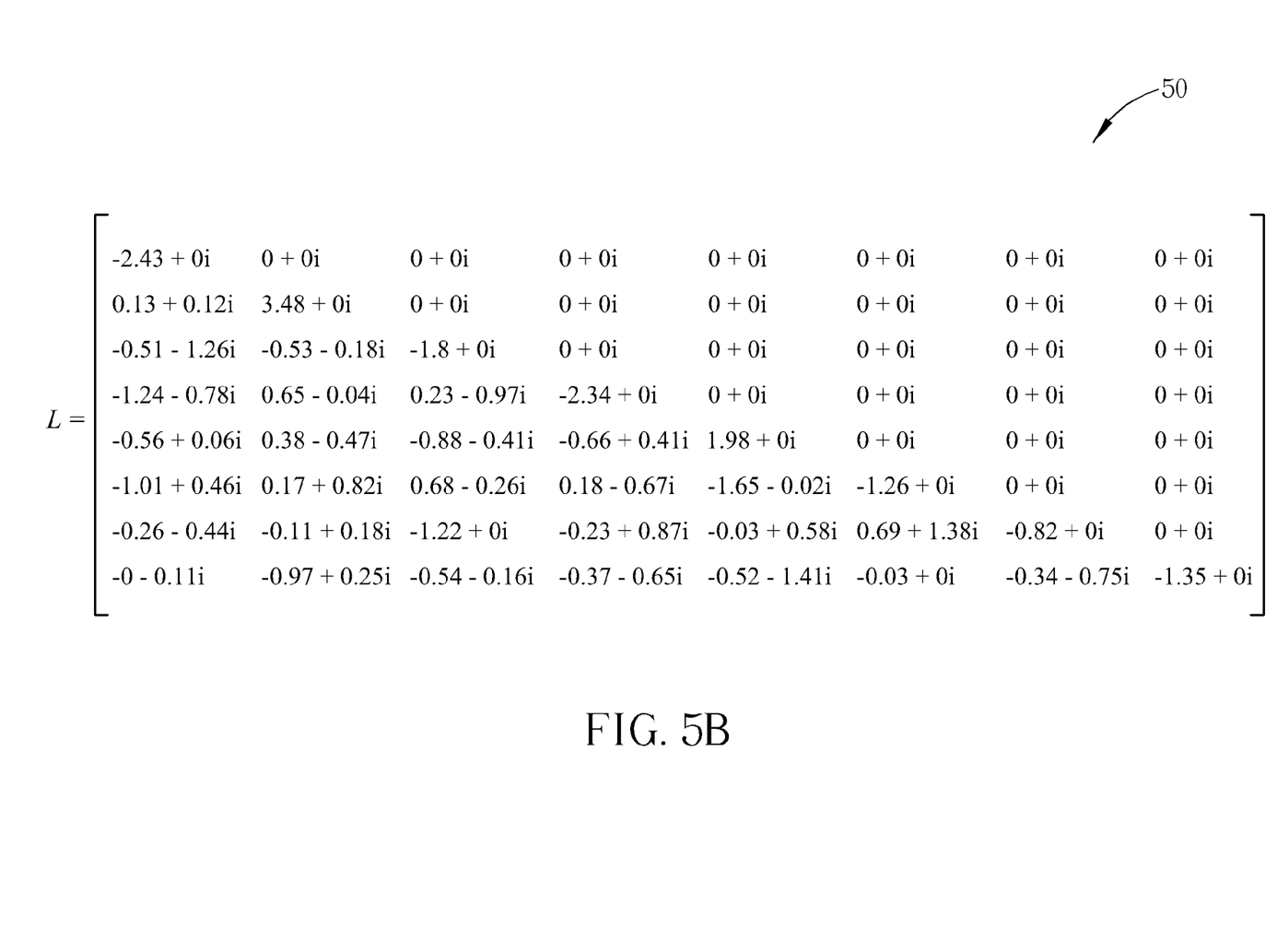
FIG. 5B and FIG. 5C are schematic diagrams of an L matrix and a Q matrix derived from FIG. 5A.
Figure 5C:
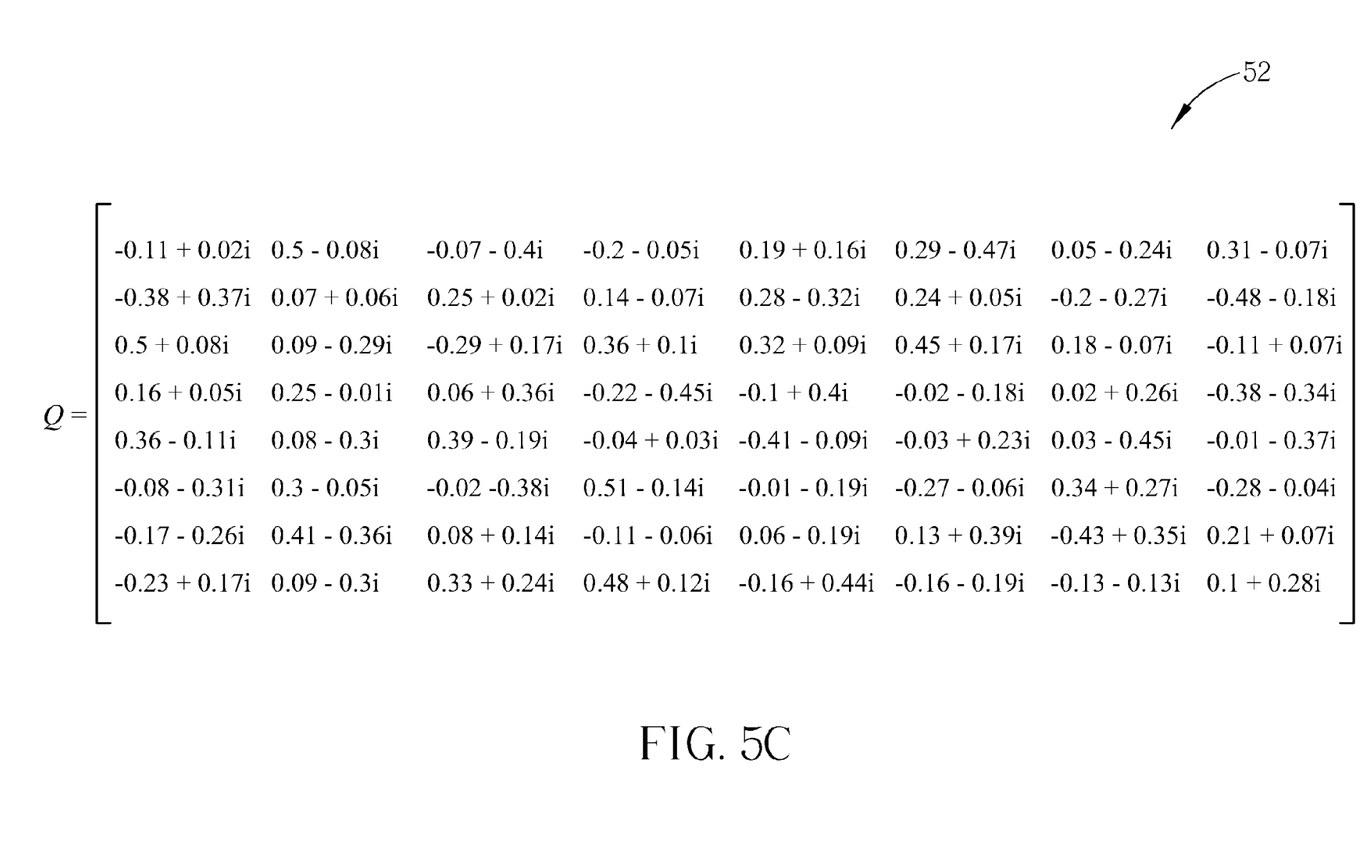

Take an AP including eight antennas and eight stations each including one antenna for example, please refer to FIG. 5A to FIG. 5C. FIG. 5A is a schematic diagram of frequency responses of the eight stations sorted according to QoS, wherein QoS1 is best and QoS8 is worst. According to the scheduling process 40, an L matrix 50 and a Q matrix 52 can be derived from LQ decomposition on a composite channel of FIG. 5A in a first iteration as shown in FIG. 5B and FIG. 5C, respectively. The LQ decomposition is known by those skilled in the art, and thus not narrated hereinafter.

Then, the orthogonalities between channels of different stations are compared with the predefined threshold. For example, assume the predefined threshold of the scheduling process 40 is tan(60)=1.7, for a third row of L matrix, an orthogonality between the station with QoS3 and the station with QoS2 is amplitude(L(3,3)/L(3,2))=3.21, and the orthogonality between the station with QoS3 and the station with QoS1 is amplitude (L(3,3)/L(3,1))=1.32. Then, the orthogonalities L(3,3)/L(3,2), L(3,3)/L(3,1) are then compared with the predefined threshold and the AP decides that the station with QoS3 can not be served in a first downlink transmission interval. By the same token, all the stations can be scheduled, i.e. interval 1 for stations with QoS1, QoS2, QoS5, interval 2 for stations with QoS3, QoS4, QoS6, and interval 3 for stations with QoS7, QoS8. In other words, the AP will make downlink transmission to stations with QoS1, QoS2 and QoS5 in the transmission interval 1, to stations with QoS3, QoS4 and QoS6 in the transmission interval 2, and to stations with QoS7 and QoS8 in the transmission interval 3.

Noticeably, since L(n,n) denotes a component of the frequency response of the station with QoSn projected on a n-th row of Q matrix 52, L(n,m) denotes a component of the frequency response of the station with QoSn projected on a m-th row of Q matrix 52, and the n-th row of Q matrix 52 and the m-th row of Q matrix 52 are orthogonal. As long as the orthogonality(n,m) is greater than a well predefined threshold, i.e. the component projected on the n-th row of Q matrix 52 is greater than the component projected on the m-th row of Q matrix 52, the frequency response of the station with QoSn can be determined substantially orthogonal to the previous stations with better QoS and corresponding to the m-th row of Q matrix 52 since the component of the frequency response of the station with QoSn projected on the m-th row of Q matrix 52 is greater enough.

Noticeably, the spirit of the present invention is that an AP can perform simultaneous transmission to stations whose corresponding channels are substantially orthogonal to each other without interfering. Those skilled in the art should make modifications or alterations accordingly. For example, the AP can directly perform simultaneous transmission to stations in a transmission interval if the AP acknowledges channels corresponding to the stations are substantially orthogonal to each other. Besides, the scheduling process 40 includes sorting the plurality of channels corresponding to the plurality of stations into the composite channel, so as to schedule simultaneous transmission to channels with better conditions first, wherein the composite channel can be build by other methods. In addition, the scheduling process 40 is only utilized for scheduling stations whose corresponding channels are substantially orthogonal to each other in a same transmission interval, other methods can be utilized for the same function and is not limited to this. Moreover, all of the above embodiments utilize an AP as the first station for example, while other embodiments can utilize a station as the first station, where the station can perform scheduling and then simultaneously transmit to some of the second stations as well, which is not limited to these.

In the prior art, the AP arranges the schedule (time slots), frequency and antenna to transmit data to different stations, i.e. still only one station can link with the AP at one time slot. In comparison, an AP or a station of the present invention can schedule stations whose corresponding channels are substantially orthogonal to each other in a same transmission interval and perform simultaneous transmission to the stations in the transmission interval, so as to increase data throughput.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-user (MU) transmission method for a multiple input multiple output (MIMO) transmission system comprising a first station and a plurality of second stations, the MU transmission method comprising:

The first station scheduling a first group of stations of the plurality of second stations in a first transmission time interval according to channel conditions of a plurality of channels corresponding to the plurality of second stations; and the first station performing simultaneous transmission to the first group of stations in the first transmission time interval;

wherein the step of the first station scheduling the first group of stations comprises:

building a composite channel of the plurality of channels corresponding to the plurality of second stations;

performing LQ decomposition on the composite channel, to generate an L matrix and an Q matrix, wherein X=LQ, X denotes the composite channel, L denotes the L matrix, Q denotes the Q matrix, and $QQ^T=I$; and deciding the first group of stations in the first transmission interval according to the L matrix.

2. The MU transmission method of claim 1, wherein the channel conditions comprise channel state information (CSI), receive beam-forming information, and quality of service (QoS) requirements.

3. The MU transmission method of claim 1, wherein channels corresponding to the first group of stations are substantially orthogonal to each other.

4. The MU transmission method of claim 1, wherein the step of building the composite channel of the plurality of channels corresponding to the plurality of second stations comprises: sorting the plurality of channels corresponding to the plurality of second stations into the composite channel.

5. The MU transmission method of claim 1, wherein an orthogonality between two of channels corresponding to the first group of stations is greater than a predefined threshold, and the orthogonality is defined as:

orthogonality($n$, $m$)=amplitude($L(n, n)/L(n,m)$), wherein orthogonality(n,m) denotes an orthogonality between n-th and m-th channels of the plurality of channels, amplitude (L(n,n)/L(n,m)) denotes |L(n,n)/L(n,m)|, L(n,m) denotes an element of an n-th row and an m-th column in the L matrix, and m<n.

6. The MU transmission method of claim 1 further comprising: the first station scheduling transmitting transmission of a multi-user request to send (MU-RTS) and a control frame (CF) to the first group of stations of the plurality of second stations in the first transmission time interval; and each of the first group of stations responding with a clear to send (CTS) at a first respective time slot indicated by the CF after receiving the MU-RTS and the CF.

7. The MU transmission method of claim 6 further comprising: the first station retransmitting the MU-RTS and the CF to the first group of stations of the plurality of second stations if the first station does not receive at least one CTS corresponding to at least one station of the first group of stations.

8. The MU transmission method of claim 7 further comprising: the first station transmitting a new MU-RTS and a new CF to the first group of stations except the at least one station or a second group of stations scheduled without the at least one station in a second transmission time interval after a pre-defined times of retransmission failures.

9. The MU transmission method of claim 6 further comprising: the first station transmitting an MU downlink (DL) data to the first group of stations after receiving CTSs corresponding to all of the first group of stations; and each of the first group of stations responding with an acknowledgement (ACK) at a second respective time slot indicated by the CF or the MU DL data after receiving the MU DL data.

10. The MU transmission method of claim 9, wherein the first station transmits the MU DL data to the first group of stations by spatial division multiple access (SDMA) or precoding.

11. The MU transmission method of claim 9 further comprising: the first station retransmitting a part of the MU DL data corresponding to at least one station of the first group of stations in a third interval if the first station does not receive at least one ACK corresponding to the at least one station.

12. A MIMO transmission system comprising a first station and a plurality of second stations, for executing the MU transmission method of claim 1.

13. A scheduling method for a first station to schedule transmissions to a plurality of second stations, comprising: scheduling simultaneous transmission to a first group of stations of the plurality of second stations in a first transmission time interval according to channel conditions of a plurality of channels corresponding to the plurality of second stations;

wherein the step of scheduling simultaneous transmission to the first group of stations comprises:

building a composite channel of the plurality of channels corresponding to the plurality of second stations;

performing LQ decomposition on the composite channel, to derive an L matrix and an Q matrix, wherein X=LQ, X denotes the composite channel, L denotes the L matrix, Q denotes the Q matrix, and $QQ^T=I$; and scheduling simultaneous transmission to the first group of stations according to the L matrix.

14. The scheduling method of claim 13, wherein the channel conditions comprise channel state information (CSI), receive beam-forming information, and quality of service (QoS) requirements.

15. The scheduling method of claim 13, wherein channels corresponding to the first group of stations are substantially orthogonal to each other.

16. The scheduling method of claim 13 further comprising scheduling simultaneous transmission to a third group of stations of the plurality of second stations in a fourth transmission time interval according to channel conditions of a plurality of channels corresponding to the plurality of second stations.

17. The scheduling method of claim 13, wherein the step of building the composite channel of the plurality of channels corresponding to the plurality of second stations comprises: sorting the plurality of channels corresponding to the plurality of second stations into the composite channel.

18. The scheduling method of claim 13, wherein an orthogonality between two of channels corresponding to the first group of stations is greater than a predefined threshold, and the orthogonality is defined as:

orthogonality($n,m$)=amplitude($L(n, n)/L(n,m)$), wherein orthogonality (n,m) denotes an orthogonality between n-th and m-th channels of the plurality of channels, amplitude (L(n,n)/L(n,m)) denotes |L(n,n)/L(n,m)|, L(n,m) denotes an element of an n-th row and an m-th column in the L matrix, and m<n.

19. An access point (AP) for executing the scheduling method of claim 13.

* * * * *